Sept. 30, 1924.
A. M. BRENNE
1,510,298
FRICTION SHOCK ABSORBING MECHANISM
Filed Nov. 2, 1922
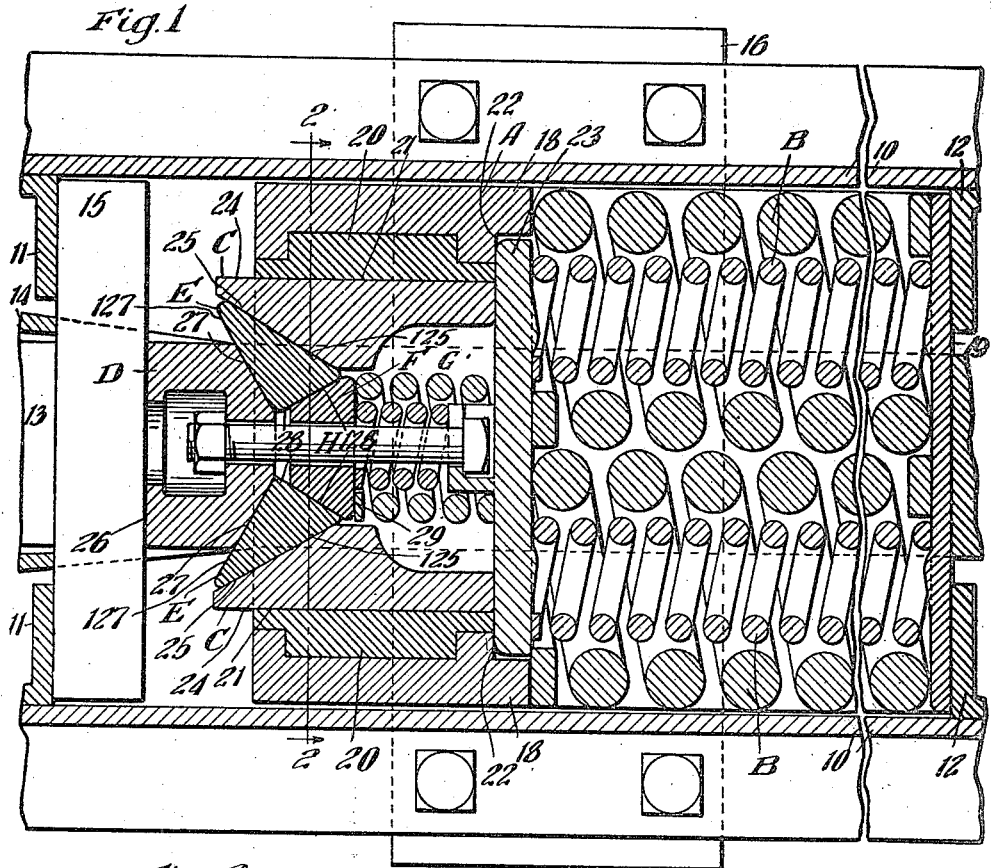
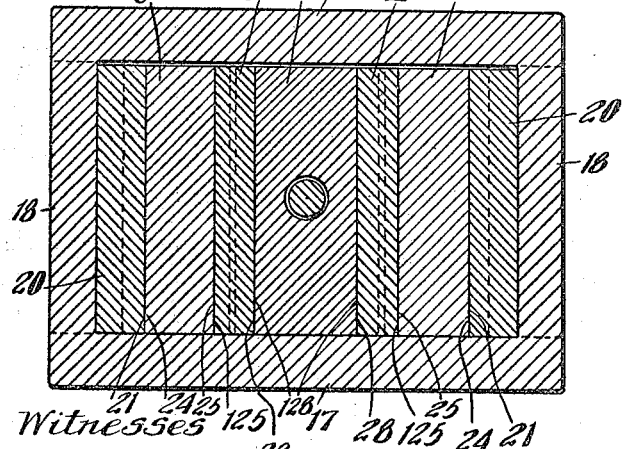
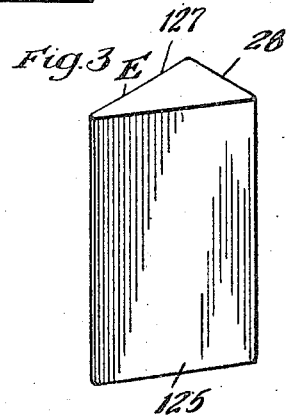
Inventor
Arild M. Brenne
By Geo. I. Haight his Atty.

Patented Sept. 30, 1924.

1,510,298

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 2, 1922. Serial No. 598,520.

*To all whom it may concern:*

Be it known that I, ARILD M. BRENNE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein are obtained high capacity and easy release by means of friction-creating elements, all of said elements being of such form as to promote economy in manufacture.

A more specific object of the invention is to provide a mechanism of the character indicated wherein a keen angle wedging effect is obtained in compression and a blunt angle effect in release, to the end that very high capacity may be generated without danger of any of the parts sticking or jamming.

In the drawing forming a part of this specification, Figure 1 is a horizontal longitudinal sectional view of a railway draft rigging showing my improvements in connection therewith. Figure 2 is a vertical transverse sectional view of the shock absorbing mechanism proper, taken on the line 2—2 of Figure 1. And Figure 3 is a detail perspective of one of the wedge elements employed in my construction.

In said drawing, 10—10 denote channel draft sills of a car underframe, to the inner faces of which are secured front stop lugs 11 and rear stop lugs 12. A portion of a drawbar is indicated at 13, the same being operatively associated with the shock absorbing mechanism proper by a hooded cast yoke 14 within which is disposed the shock absorbing mechanism proper and a front follower 15. The yoke and parts therewithin are supported in operative position by a detachable saddle plate 16.

The improved shock absorbing mechanism proper, as shown, comprises, broadly, a combined friction shell and spring cage casting A; twin arranged main springs B—B; a pair of friction shoes C—C; a pressure-receiving and transmitting block D; a pair of wedge blocks E—E; a combined spring follower wedge F; a secondary spring G; and an anchor bolt H.

The casting A, as shown, is of rectangular cross section having top and bottom walls 17—17, side walls 18—18, and an integral rear wall 19, the latter functioning as the rear follower of the mechanism. The side walls 18 are made relatively short so as to leave the greater portion of the sides of the casting open to permit of the insertion and removal of the springs and certain other parts. The side walls 18, on their inner faces, are provided with renewable hardened liners 20, the inner faces of the latter providing longitudinally extending flat shell friction surfaces 21. The side walls are further shouldered or notched as indicated at 22—22 to form limiting stops for the outward movement of the twin spring follower 23, the twin springs being interposed between said follower and the rear wall of the casting.

The two friction shoes C are of like construction, each being provided on its outer side with a longitudinally extending flat friction surface 24 cooperable with the corresponding adjacent shell friction surface. On its inner side each shoe C is provided with a wedge face 25 which extends rearwardly and toward the axis of the mechanism at a relatively keen angle.

The block D has an outer transversely extending flat face 26 which bears against the follower 15. At its inner end, the block D is provided with two oppositely extending faces 27—27 which extend rearwardly of the casting and toward the axis thereof at a very blunt angle, the angle being such that the faces provide true releasing surfaces during the release action of the mechanism.

Interposed between the block D and the shoe C are the two wedge elements E, each of the latter being of triangular cross section and having a front face 127 cooperable with the corresponding face 27 of the block D. On its outer side, each wedge E has another face 125 extending at the same angle as and cooperable with the corresponding shoe wedge face 25. At its inner end, each wedge E is provided with a third face 28. The faces 28 extend in opposite directions and diverge rearwardly of the casting and extend at a relatively acute angle with respect to the axis of the mechanism and forces applied parallel or approximately parallel thereto.

The combined spring follower and wedge F is formed on its outer side with wedge faces 128—128 cooperable with the wedge faces 28, previously described. On its inner side, the wedge F has a transverse flat face 29 forming a bearing for the front end of the secondary spring G, the rear end of the latter bearing upon the front face of the spring follower 23.

The retainer bolt H is anchored at its forward end within a suitable recess in the block D and at its rear end is anchored beneath an overhanging slotted flange formed on the front face of the follower 23. The block D and wedge F are suitably recessed to accommodate the shank of the bolt. With this construction, it is evident that the bolt H serves to retain all of the parts in assembled position and to hold all of the elements of the friction-creating system in tight contact.

In actual practice, the wedge faces 25 of the shoes will extend at an angle of approximately 30° with the respective shell friction surfaces and the included angle between the faces 127 and 125 of each wedge E will also preferably approximate 30°. The faces 128 and the wedge F will preferably make an angle of approximately 30° with the axis of the mechanism.

The operation of the device, assuming a compression stroke under buff, is as follows: As the block D is forced rearwardly under pressure received from the drawbar through the follower 15, the two wedges E will be forced rearwardly in unison therewith, without there being any appreciable or effective true wedging action between the sets of faces 27 and 127 of the block D and wedges E respectively, on account of the extremely blunt angle which is made with these faces with respect to the axis of the mechanism. The true wedging action is therefore set up between the wedges E and the shoes C on the cooperating sets of faces 25 and 125, this action producing a heavy spreading or wedging effect, as will be obvious. The two wedges E will act substantially as a solid unit in their wedging action with respect to the shoe C, on account of the wedge F which engages the inner ends of the wedges E at an acute angle, it being understood that the wedge F is always under spring pressure from the spring G which is placed under initial compression. As the wedging or spreading action is set up as above described, the shoes C will be forced rearwardly of the shell, yielding resistance being afforded the same by the twin springs B. Upon removal of the actuating force, it is evident that the block D is free to readily disengage itself from or fall away from the wedges E, on account of the releasing angle of the cooperating faces 27 and 127. Furthermore, the reaction of the spring G acting through the wedge F, will thereupon readily project the wedges E outwardly or at least collapse the wedge and shoe system on account of the large included angle between the outwardly flaring wedge surfaces 25 of the two shoes C. After the friction unit has collapsed, it is evident that the main springs B will project all of the parts out to their normal full release position. At this point, attention is called to the fact that wear of the parts of the friction generating elements will automatically be compensated for by gradual creeping out of the wedge elements E under the influence of the wedge F and spring G.

From the preceding description, it will be seen that I am enabled to obtain very high capacity since the angle of the faces 25 and 125 may be made very acute with respect to the axis of the mechanism without any danger of sticking. Furthermore, it will be observed that all of the friction shoes and wedges are of very simple construction, reducing their cost of manufacture to a minimum.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction member having longitudinally extending friction surfaces; of friction shoes cooperable with said surfaces and having wedge faces extending at a keen angle with respect to the line of applied forces; a main spring resistance for said shoes; a pressure-receiving and transmitting block having faces inclined at a blunt releasing angle with respect to the line of applied forces; wedges interposed between said releasing angle faces of the block and the keen angle wedge faces of the shoes and cooperable therewith, said wedges having other wedge faces extending at a keen angle with respect to the line of applied forces; wedging means cooperable with the last named faces of said wedges; and secondary spring means cooperable with said wedging means to maintain the latter in contact with said wedges.

2. In a friction shock absorbing mechanism, the combination with a friction shell having a pair of opposed friction surfaces; of opposed friction shoes cooperable with said shell surfaces, said shoes having wedge faces converged inwardly of the shell and extending at a keen angle with respect to the axis thereof; a main spring resistance for said shoes; a pressure-receiving and transmitting block having faces converged inwardly of the shell and extending at a blunt angle with respect to the axis thereof; a wedge interposed between said block and each shoe and having faces cooperable with the respective faces of the block and shoe, said wedges having additional faces at their inner ends extending at a keen angle with respect to the axis of the mechanism and diverging inwardly of the shell; wedge means cooperable with said last named faces of the wedges; and auxiliary spring means cooperable with said wedge means to maintain the latter in tight contact with said wedges.

3. In a friction shock absorbing mechanism, the combination with a friction shell having a pair of transversely opposed longitudinally extending friction surfaces; a pair of opposed friction shoes having keen angle wedge faces at their outer ends; a main spring resistance for said shoes; a pressure-transmitting block having opposed faces at its inner end extending inwardly of the shell and at a blunt angle with respect to the axis thereof; wedges interposed between said block and the shoes and having cooperating faces with the block and shoes, said wedges having additional faces at their inner ends diverging inwardly of the shell and extending at an acute angle with respect to the axis thereof; a wedge cooperable with said last named faces of the first named wedges; and auxiliary spring means cooperable with said last named wedge to maintain the latter in tight contact with the first named wedges.

4. In a friction shock absorbing mechanism, the combination with a friction shell having interior longitudinally extending friction surfaces; of friction shoes cooperable with said shell, said shoes having wedge faces at their outer ends extending inwardly of the shell at a keen angle with respect to the axis thereof; a main spring resistance; a spring follower interposed between said resistance and the inner ends of the shoes; a pressure-transmitting block having faces at its inner end extending inwardly of the shell and at a blunt angle with respect to the axis thereof; a wedge interposed between each shoe and block, each of said wedges having a wedge face at its inner end extending at an acute angle with respect to the axis of the shell and diverging inwardly of the shell; wedge means cooperable with said last named wedge faces; and a secondary spring interposed between said wedge means and said spring follower.

5. In a friction shock absorbing mechanism, the combination with a friction shell having interior longitudinally extending friction surfaces; of friction shoes cooperable with said surfaces, said shoes having wedge faces at their outer ends; a main spring resistance for said shoes; wedges engaging and cooperable with said shoes, said wedges having additional wedge faces at their inner ends diverging inwardly of the shell; wedge means cooperable with said last named wedge faces; a secondary spring cooperable with said wedge means; and a pressure-receiving and transmitting block engaging and cooperable with said first named wedges and having release angle engagement therewith.

6. In a friction shock absorbing mechanism, the combination with a friction shell having opposed interior friction surfaces; of opposed friction shoes cooperable with said shell surfaces, said shoes having wedge faces converged inwardly of the shell and extending at a keen angle with respect to the axis thereof; a main spring resistance; a pressure-receiving and transmitting block having faces converged inwardly of the shell and extending at a blunt angle with respect to the axis thereof; a wedge interposed between said block and each shoe and having faces cooperable with the respective faces of the block and shoe, said wedges having additional faces at their inner ends diverging inwardly of the shell and extending at a relatively keen angle with the axis thereof; wedge means cooperable with said last named faces of the wedge; and a second spring cooperable with said last named wedge means.

7. In a friction shock absorbing mechanism, the combination with a friction shell having an interior pair of opposed longitudinally extending friction surfaces; of a main spring resistance; a pair of opposed friction shoes cooperable with said shell, said shoes having wedge faces converged inwardly of the shell and extending at a keen angle with respect to the axis thereof; a pressure-receiving and transmitting member having a pair of opposed faces converged inwardly of the shell and extending at a blunt releasing angle with respect to the axis thereof; a wedge interposed between each face of said member and the corresponding shoe-wedge face cooperable therewith, said wedges, at their inner ends, having faces diverging inwardly of the shell; a secondary spring resistance; and a member engaged by said last named spring resistance, having faces cooperable with said inclined faces of said wedges and normally tending to force the latter in a direction outwardly of the shell.

In witness that I claim the foregoing I have hereunto subscribed my name this 6th day of October 1922.

ARILD M. BRENNE.

Witnesses:
UNA C. GRIGSBY,
H. M. DEAMER.